Sept. 8, 1953  S. H. MARROW  2,651,745
DRY RECTIFIER ASSEMBLY
Filed Jan. 29, 1952

Inventor
S.H. MARROW
By
Attorney

Patented Sept. 8, 1953

2,651,745

UNITED STATES PATENT OFFICE 2,651,745

DRY RECTIFIER ASSEMBLY

Sidney Hughes Marrow, London, England, assignor to International Standard Electric Corporation, New York, N. Y., a corporation of Delaware Application January 29, 1952, Serial No. 268,814
In Great Britain February 8, 1951

1 Claim. (Cl. 317—234)

The present invention relates to electrical components comprising assemblies of electrical elements such as individual dry plate rectifiers or condensers, in a tube of insulating material.

Assembly arrangements of such elements in a tube of insulating material are well known as for instance those described and shown in British Patents No. 526,482, accepted September 19, 1940, and No. 626,394, accepted July 14, 1949. The object of the present invention is the provision of an assembly arrangement in which it is not necessary to provide rivet or screw holes or other fixing means such as grooves for end caps in the tube of insulating material which contains the elements of the electrical component.

According to one feature of the invention an electrical component of the type in which elements such as condensers or dry plate rectifiers are assembled within a tube of insulating material is characterised by the ends of the tube being closed by spring-metal washers which are of slightly larger surface dimensions that the internal size of the tube whereby when they are forced into the tube they become dished and offer resistance to withdrawal.

Connection with the elements within the tube may be made through the said spring-metal washers or the washers themselves may be provided with suitable extensions therefor.

Another feature of the invention comprises an electrical component and electrical rectifier, wherein the elements, e. g. selenium rectifier elements, are assembled within a tube of insulating material and are retained within the tube by means of resilient metal washers forced into the ends of the tube.

The invention will be understood from the following detailed description of a dry rectifier assembly taken in conjunction with the accompanying drawings in which—

Figure 1:
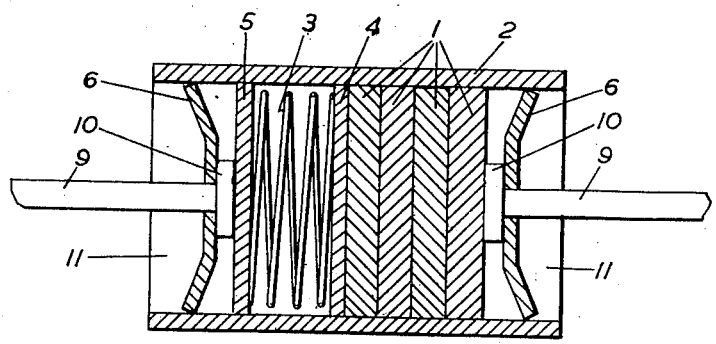
Fig. 1 shows in sectional elevation a dry rectifier assembly.

A suitable number of rectifier elements 1 are stacked together in a tube 2 insulating material such as phenol fibre of suitable internal size and having a length rather longer than the stack of elements. At the counterelectrode side of the rectifier elements a spring 3, placed between contacting washers 4 and 5, is inserted into the tube 2. Metal washers 6 having an external size slightly greater than the internal size of the tube 2 are then forced into the tube, one from each end and closed towards one another until the spring 3 is suitably compressed.

Figure 2:
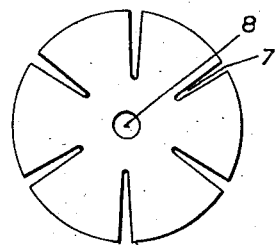
Fig. 2 shows in plan a metal washer or disc.

The washers 6, being of slightly larger size than the tube 2 will bend or "dish" when forced into the tube and, in order that they may dish uniformly or symmetrically, they may be provided with slots or cuts as shown in Fig. 2 in which a circular washer is shown having a number of radial slots 7.

The action of the washers is to bite into the internal wall or walls of the tube to resist any attempts at withdrawal and for this purpose they are preferably made from spring-metal of suitable thickness.

In addition to the radial slots 7 the washers 6 may be provided with a central hole 8 through which a headed wire lead 9 is threaded before insertion into the tube with the headed ends 10 towards the elements. Other methods of providing leads on terminations may be employed if desired such as wires soldered to the washers 6. Finally, the open ends 11 of the tube 2 may be sealed with any suitable compound such as cold setting resin.

While the washer shown in Fig. 2 is circular it will be understood that the rectifier elements the internal section of the insulating tube, and the spring metal washers may be of any suitable shape such as rectangular without departing from the scope of the invention. Furthermore either or both of the washers 4 and 5 may be omitted where it is considered that the spring 3 can make satisfactory electrical contact with the washers 6 or headed end 10, and the exposed face of the end element.

It will also be obvious to those skilled in the art that, if desired, one spring washer may be forced with the tube before insertion of the elements, thereby enabling accurate location within the tube to be achieved.

While the principles of the invention have been described above in connection with specific embodiments and particular modifications thereof, it is to be clearly understood that this description is made only by way of example and not as a limitation on the scope of the invention.

What I claim is:

An electrical component comprising a tube of insulating material, a stack of dry plate rectifiers fitting snugly inside said tube, each rectifier extending transversely of the tube, a first flat washer against one end of said stack, a spiral spring compressed against said flat washer, a second flat washer against the other end of said spring, a pair of resilient retaining metal washers each forced into an opposite end of said tube, each of said washers being of slightly larger surface dimensions than the entire size of the tube whereby upon being forced into the tube they become dished and offer resistance to withdrawal, each of said washers having a central opening, a pair of connecting wires each passing from outside the tube through one of said central openings and ending in a flat contact head of greater diameter than the opening but of smaller diameter than the inside of the tube, said flat heads being forced by said resilient metal washers against the second flat washer and the opposite end of the stack.

SIDNEY HUGHES MARROW.

References Cited in the file of this patent

UNITED STATES PATENTS

| Number | Name | Date |
|---|---|---|
| 1,649,741 | Ruben | Nov. 15, 1927 |
| 1,890,312 | Caine | Dec. 6, 1932 |

FOREIGN PATENTS

| Number | Country | Date |
|---|---|---|
| 822,164 | France | Sept. 13, 1937 |